United States Patent [19]

Hara et al.

[11] Patent Number: 5,157,311

[45] Date of Patent: Oct. 20, 1992

[54] BRUSHLESS MOTOR

[75] Inventors: Takashi Hara; Sueo Matsumoto, both of Koriyama; Tetsuro Shimmura, Toyohashi; Tsutomu Kinoshita, Kosai, all of Japan

[73] Assignees: Matsushita Electric Industrial Co., Ltd., Osaka; Asmo Co., Ltd., Shizuoka, both of Japan

[21] Appl. No.: 736,591

[22] Filed: Jul. 26, 1991

[30] Foreign Application Priority Data

Jul. 31, 1990 [JP] Japan .................................. 2-203299
Jul. 31, 1990 [JP] Japan .................................. 2-203300

[51] Int. Cl.$^5$ ............................................. H02P 1/18
[52] U.S. Cl. ................................... 318/254; 318/138; 318/430
[58] Field of Search ............... 318/138, 254, 430, 431, 318/439; 310/68 R

[56] References Cited

U.S. PATENT DOCUMENTS

| | | | |
|---|---|---|---|
| 3,909,690 | 9/1975 | Sugiura | 318/138 |
| 4,429,262 | 1/1984 | Utenick | 318/254 |
| 4,525,657 | 6/1985 | Nakase et al. | 318/254 |
| 4,584,505 | 4/1986 | Chung et al. | 318/254 |
| 4,631,459 | 12/1986 | Fujioka et al. | 318/254 |
| 4,686,437 | 8/1987 | Langley et al. | 318/254 |
| 4,879,498 | 11/1989 | Shinohara et al. | 318/254 |
| 4,897,583 | 1/1990 | Rees | 318/254 |
| 4,978,895 | 12/1990 | Schwarz | 318/254 |
| 5,036,264 | 7/1991 | Ueki | 318/254 |

FOREIGN PATENT DOCUMENTS

| | | |
|---|---|---|
| 0150324 | 8/1985 | European Pat. Off. . |
| 3044056 | 6/1981 | Fed. Rep. of Germany . |
| 8431241 | 1/1985 | Fed. Rep. of Germany . |
| 60-82092 | 5/1985 | Japan . |
| 60-91853 | 5/1985 | Japan . |
| 60-160390 | 8/1985 | Japan . |
| 60-162167 | 8/1985 | Japan . |
| 61-54860 | 3/1986 | Japan . |
| 1125657 | 8/1968 | United Kingdom . |
| 2014810 | 8/1979 | United Kingdom . |

*Primary Examiner*—Bentsu Ro
*Attorney, Agent, or Firm*—Stevens, Davis, Miller & Mosher

[57] ABSTRACT

A brushless motor includes a rotor having permanent magnets and a coil for rotating the rotor. In the motor, a switching element is connected between the coil and a power source, a magnetic sensor is provided for detecting the position of one of the permanent magnets of the rotor to control the switching operation of the switching element, and a delay circuit is provided for delaying a signal from the magnetic sensor and then applying the delayed signal to the switching element.

With this arrangement, the apparent hysteresis width of the magnetic sensor can be broadened and the prior art problem is avoided wherein variations in the hysteresis width of the magnetic sensor results in disabled rotation of the rotor.

5 Claims, 7 Drawing Sheets

FIG. I PRIOR ART
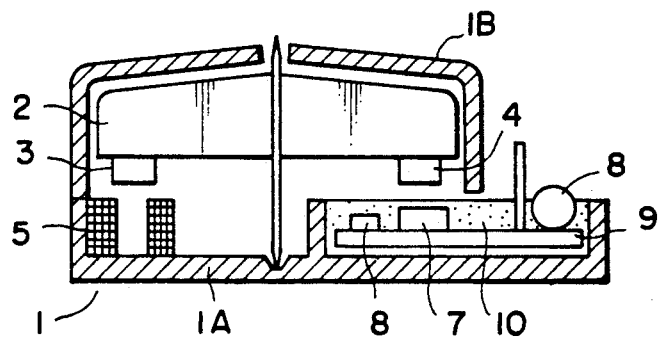
FIG. 5
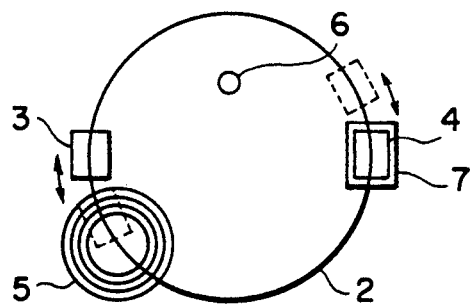
FIG. 8
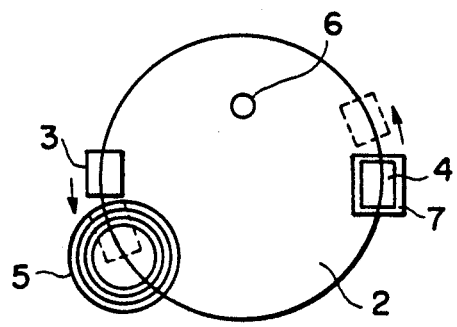

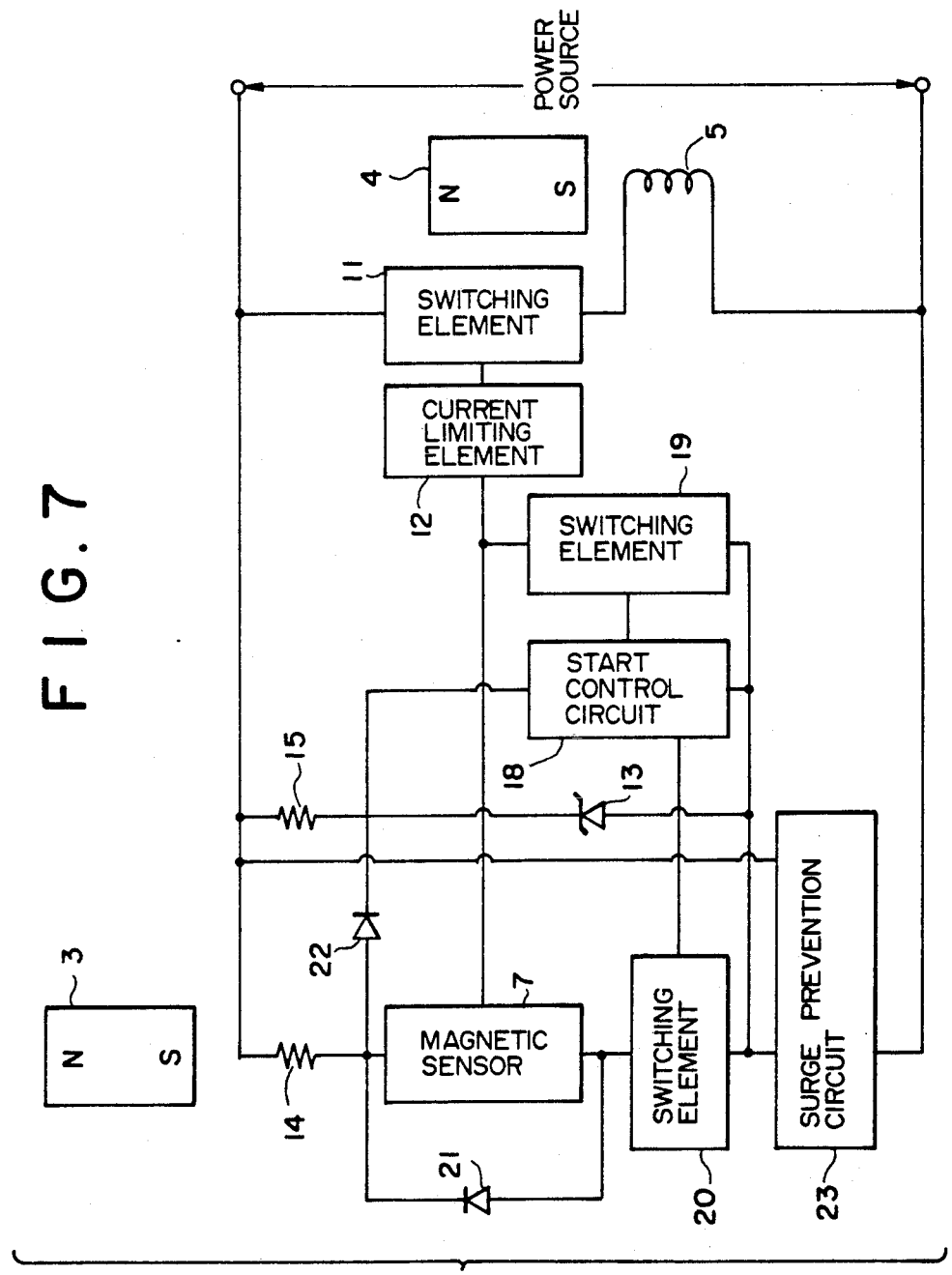

BRUSHLESS MOTOR

BACKGROUND OF THE INVENTION

The present invention relates to a brushless motor which controls the rotation of a rotor on a single-phase basis.

FIGS. 1 to 3 show an arrangement of a prior art brushless motor of the type referred to. More specifically, FIG. 1 shows a cross-sectional view of the prior art brushless motor showing an array of parts in the motor, FIG. 2 is an exploded perspective view of the parts of the motor, and FIG. 3 is a block diagram of the brushless motor. In the drawings, a casing 1 comprises a lower casing 1A and an upper casing 1B. Rotatably supported within the casing 1 is a rotor 2. Mounted on the bottom of the rotor 2 are permanent magnets 3 and 4 at positions symmetrical with respect to the center of the rotor 2. A coil 5 is mounted on the lower casing 1A. When a current is passed through the coil 5, this causes a magnetic field to be generated so that the permanent magnets 3 and 4 are attracted to each other and therefore the rotor 2 is turned. A magnet 6 is disposed to the lower casing 1A to position the rotor 2 at its initial position between the permanent magnets 3 and 4. When a power source is turned off, the magnet 6 for positioning the rotor 2 at its initial position has the same polarity as that of the permanent magnets 3 and 4, which results in that the rotor 2 stops at its balanced position because the magnets repel each other. A magnetic sensor 7 such as a Hall effect element, is mounted together with another electronic element 8 on a substrate 9 which in turn is disposed on the lower casing 1A. In more detail, the magnetic sensor 7 is located at such a position as to be subjected to the influence of magnetic force of the permanent magnets 3 and 4 of the rotor 2. The substrate 9 having such parts mounted thereon is disposed on the lower casing 1A and then molded with resin material 10. Referring to FIG. 3, between the coil 5 and the power source, a switching element 11 such as a transistor is inserted. The switching element 11 is connected with a current limiting element 12 such as a resistor which in turn is connected with an output terminal of the magnetic sensor 7. That is, the magnetic sensor 7 detects the positions of the permanent magnets 3 and 4 and generates an output signal that is sent to the switching element 11. The switching element 11 controls supply of a current to the coil 5 on the basis of the output signal received from the magnetic sensor 7. In FIG. 3, reference numeral 13 denotes a constant-voltage diode, 14 a resistor.

In the operation of such an arrangement, when the permanent magnet 3 is positioned above the magnetic sensor 7, the magnetic sensor 7 generates an on-state output and thus the switching element 11 is turned on so that a current flows through the coil 5, thus resulting in that a torque for attracting the permanent magnet 4 is generated in the coil 5 and the rotor 2 is rotated. As the permanent magnet 4 moves toward to the vicinity of the coil 5, the permanent magnet 3 moves away from the vicinity of the magnetic sensor 7, whereby the magnetic sensor 7 generates an off-state output and thus the switching element 11 is turned off. This causes the current so far flowing through the coil 5 to be stopped so that the attractive force between the permanent magnet 4 and the coil 5 disappears and the rotor 2 is continuously coasting. Thereafter, the permanent magnets 3 and 4 become opposite in state to each other and operatively move in a similar manner to what mentioned above.

A force resisting the movement of the rotor 2 trying to continuously coast exists as a repulsive force between the magnet 6 for positioning of the initial position of the rotor 2 and the permanent magnets 3 and 4 of the rotor 2, and the magnetic sensor 7 has a hysteresis width (which will be referred to as the BW, hereinafter) between a detection level (which will be referred to as the BH-L, hereinafter) changing from its detection off to detection on and a detection level (which will be referred to as the BL-H, hereinafter) changing from its detection on to detection off. For this reason, in the case where the rotor 2 loses an attractive force caused by the coil 5 at the BL-H and is subjected to the influence of the repulsive force of the magnet 6 for positioning of the initial position of the rotor 2 to thereby start to reversely rotate, the rotor 2 returns to the BH-L and again normally rotates under the influence of the attractive force of the coil 5, which is repeated several times. After this, acceleration obtained during a period between the BL-L and BL-H causes the rotor 2 to overcome the repulsive force of the magnet 6 for positioning of the initial position of the rotor 2.

Such a prior art brushless motor, however, has had a problem that variations in the BW of the magnetic sensor cause the motor not to be able to rotate under the worst conditions (when the BW is narrow).

The current-level technique of suppressing variations in the BW of the magnetic sensor has its limit and thus it has been impossible to solve the problem.

SUMMARY OF THE INVENTION

In view of such circumstances, it is therefore an object of the present invention to provide a brushless motor which is immune to the influence of variations in the BW of a magnetic sensor.

In accordance with an aspect of the present invention, the above object is attained by providing a brushless motor which comprises a rotor having permanent magnets, a coil for rotating the rotor, a switching element inserted between the coil and a power source, a magnetic sensor for detecting a position of one of the permanent magnets of the rotor to control switching operation of the switching element, a current limiting element inserted between the magnetic sensor and the switching element, and a delay circuit inserted between the current limiting element and the magnetic sensor or between the current limiting element and the switching element. Further, the present invention is provided with a timer circuit which conducts the switching element for a constant time at the time of turning on the power source.

With such an arrangement, in the case where the rotor yielding the repulsive force of the initial-position positioning magnet of the rotor cannot normally rotate and is vibrating, the delay circuit causes the switching element to be turned on even after the turning off of the magnetic sensor at the BL-H; whereas, the delay circuit causes the switching element to be turned off even after the turning on of the magnetic sensor at the BH-L. This means that the apparent hysteresis width BW of the magnetic sensor is broadened so that an acceleration acquired during the apparent hysteresis width BW enables the rotor to overcome the repulsive force and rotate normally, thereby eliminating the influence of variations in the BW of the magnetic sensor.

Further, the timer circuit is provided for conducting the switching element for the constant time at the time of turning on the power source, so that, even when one of the permanent magnets of the rotor is stopped immediately above the initial-position positioning magnet of the rotor though this is very rare, the conduction of the switching element for the constant time at the time of turning on the power source causes the rotor to be moved by the attractive force of the coil, thereby ensuring that the rotor is returned to its initial position determined by the repulsive force of the initial-position positioning magnet of the rotor and thus any failure of starting the rotor can be avoided.

In accordance with another aspect of the present invention, in place of the delay circuit or the timer circuit, there is provided a start control circuit in the motor, which conducts the switching element for a predetermined time independently of control of the magnetic sensor at the time of turning on the power source, makes the switching element non-conductive for a predetermined time thereafter and further thereafter for being made independent of the control of the switching element.

With this arrangement, even in the case where the power source is turned on during the reversal rotation of the rotor between a position where the coil loses its attractive force at the BL-H and the initial-position positioning magnet of the rotor or where the power source is turned on during stoppage of one of the permanent magnets of the rotor immediate above the initial-position positioning magnet, the switching element is first conducted for the constant time (about 10 seconds), so that, even when the rotor is previously rotated, the rotor is subjected to a braking by the attractive force of the coil and to a complete stoppage. Thereafter, since the switching element is put in its non-conductive state for a constant time (about 2 seconds), the attractive force of the coil disappears and the rotor is reversely rotated by the repulsive force of the initial-position positioning magnet of the rotor and is completely stopped at its balanced point.

Further thereafter, since the power of the power source is applied to the motor for its normal operation, the influence of variations in the hysteresis width BW of the magnetic sensor can be eliminated and the motor can be positively started.

BRIEF DESCRIPTION OF THE DRAWINGS

FIG. 1 is a cross-sectional view of a prior art brushless motor showing an array of parts in the motor;

FIG. 5 is a diagram for explaining the operational principle of the motor;

FIG. 7 is a circuit diagram of a brushless motor in accordance with another embodiment of the present invention;

FIG. 8 is a diagram for explaining the operation of the motor; and

DESCRIPTION OF THE PREFERRED EMBODIMENTS

Figure 2:
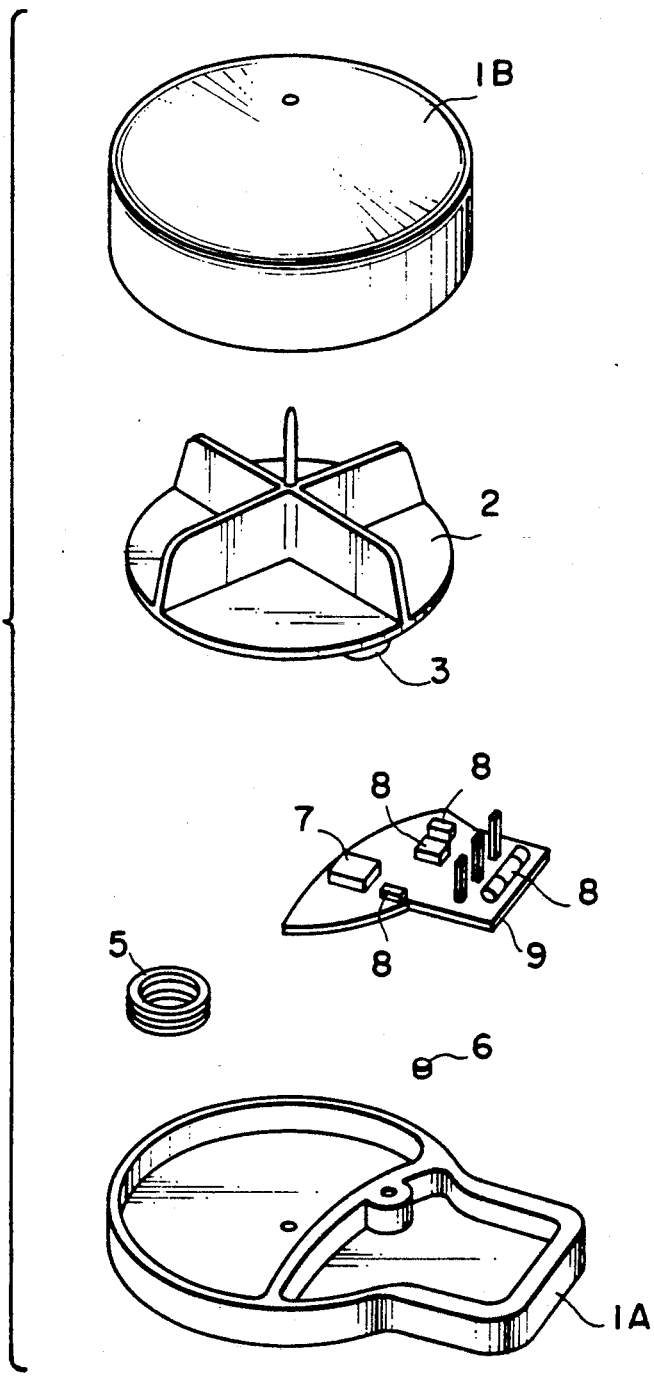
FIG. 2 is an exploded perspective view of the parts of the motor.
Figure 3:
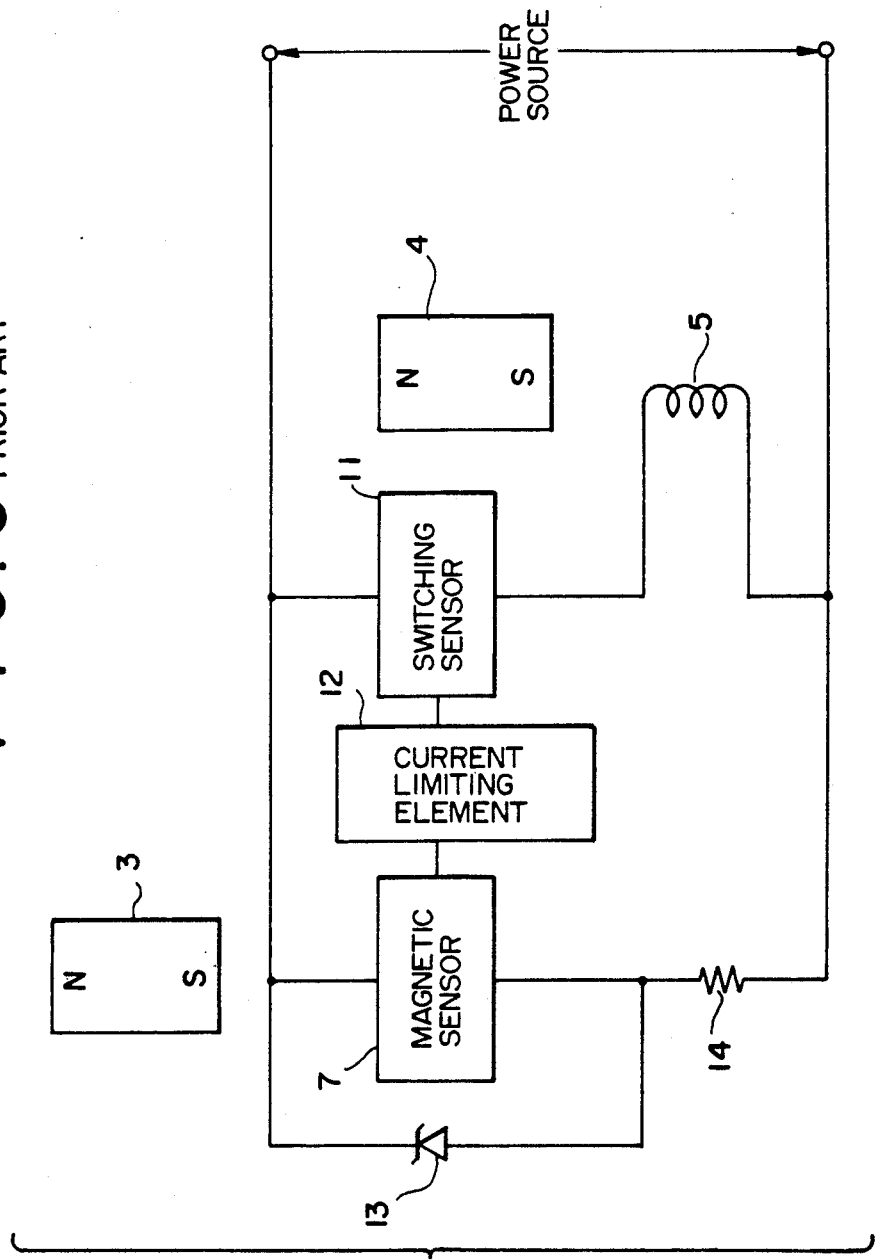
FIG. 3 is a circuit diagram of the motor.
Figure 4:
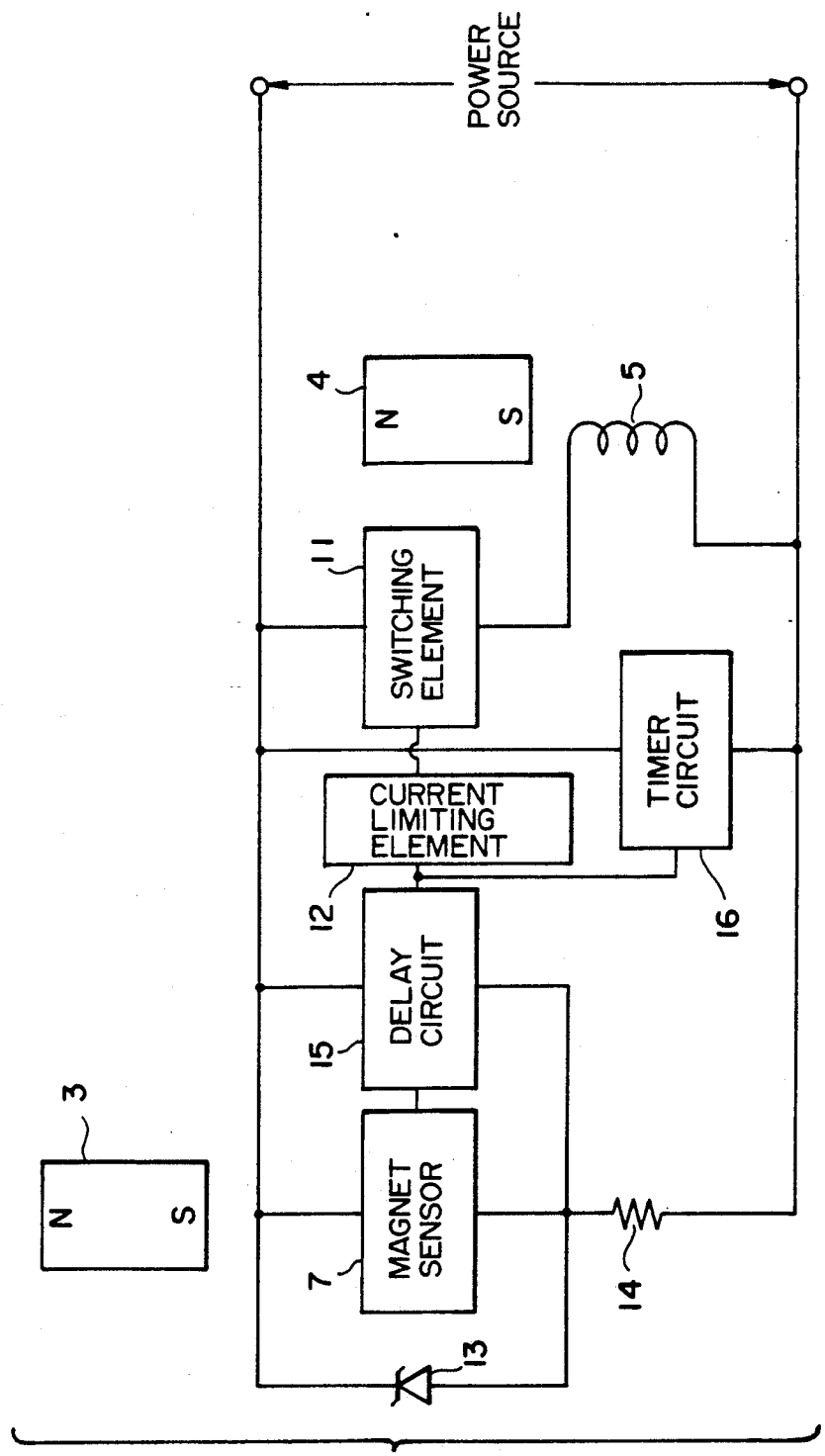
FIG. 4 is a circuit diagram of a brushless motor in accordance with an embodiment of the present invention.
Figure 6:
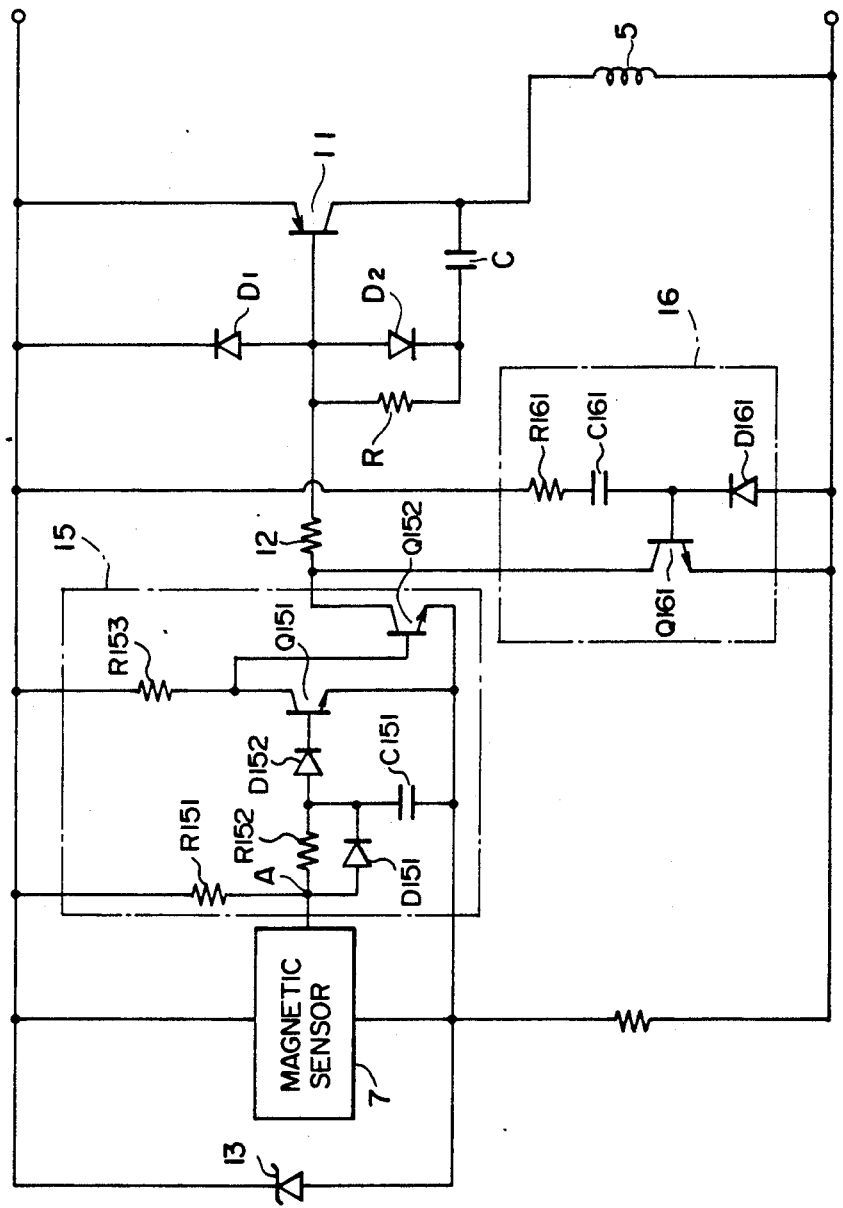
FIG. 6 is a specific circuit diagram of the motor.

An embodiment of the present invention will be described with reference to FIGS. 4 to 6. More specifically, FIG. 4 shows a circuit diagram of a brushless motor in accordance with an embodiment of the present invention, FIG. 5 is a diagram for explaining the operational principle of the motor, and FIG. 6 is a specific circuit diagram of the motor. In FIGS. 4 to 6, the same parts as those in the prior art motor in FIGS. 1 to 3 are denoted by the same reference numerals. In the drawings, a delay circuit 15, which is inserted between the current limiting element 12 and the magnetic sensor 7, acts to prolong, in addition to the BW of the magnetic sensor 7, the on period of the switching element 11 to lengthen the energization period of the coil 5, only when the rotor 2 is vibrating as overcome by the repulsive force of the magnet for positioning of the initial position of the rotor. In more detail, the delay circuit 15, as shown in FIG. 6, comprises transistors Q151 and Q152, diodes D151 and D152, resistors R151 and R152 and a capacitor C151. In the circuit of FIG. 6, when such a magnetic sensor 7 as a Hall effect element is switched from its on state to off, a potential at a point A gradually increases to a level corresponding to a diode forward voltage plus base/emitter voltage of transistor Q151, at which time the transistor Q151 is turned on and the transistor Q152 is turned off so that the switching element 11 is turned off as delayed by a predetermined time from the turning off of the magnetic sensor 7. Conversely, when the magnetic sensor 7 is switched from its off state to on, the transistor Q151 is turned off as delayed by a time corresponding to the discharge time during which the capacitor C151 is discharged through the diode D151, so that the switching element 11 is turned on as delayed by a predetermined time from the turning on of the magnetic sensor 7.

The delay circuit 15 may be inserted between the current limiting element 12 and the switching element 11. A timer circuit 16 is provided, when the power source is turned on, for causing the current limiting element 12 to supply a current to the switching element 11 for a predetermined time.

With such an arrangement, when the permanent magnet 4 is positioned above the magnetic sensor 7 as shown in FIG. 5, the magnetic sensor 7 generates an on-state output and the switching element 11 is turned on as delayed by a predetermined time, so that a current flows through the coil 5 which develops a torque for attracting the permanent magnet 3, whereby the rotor 2 is rotated. As the permanent magnet 3 is moved close toward the coil 5, the permanent magnet 4 is moved away from the magnetic sensor 7, so that the magnetic sensor 7 generates an off-state output and the switching element 11 is turned off as delayed by a predetermined time therefrom. This results in that the supply of the current to the coil 5 is stopped so that an attractive force between the permanent magnet 3 and the coil 5 disappears, whereby the rotor 2 is coasting. Thereafter, the permanent magnets 3 and 4 are put in the mutually opposite positions to the above and continuously perform similar movement to the above.

A force resisting the movement of the rotor 2 trying to coast continuously exists as a repulsive force between the magnet 6 for positioning of the initial position of the rotor 2 and the permanent magnets 3 and 4 of the rotor 2. In the present embodiment, even when the rotor 2 is reversely rotated and vibrated, the delay circuit 15 provides a delay time in addition to the hysteresis width BW of the magnetic sensor 7 between its detection level BH-L changing from its detection off to detection on and its detection level BL-H changing from its detection on to detection off. As a result, the coil 5 is energized for a long time when compared to the prior art, so that, when the rotor 2 loses the attractive force of the coil 5 at the detection level BL-H and yields the repulsive force of the magnet 6 for positioning of the initial position of the rotor 2 to thereby start to reversely rotate, the rotor 2 returns to the detection level BH-L and again starts to normally rotate under the influence of the attractive force of the coil 5, which is repeated several times. Thereafter, an acceleration obtained during a period corresponding to a sum of a duration from the BH-L to the BL-H and the delay time of the delay circuit 15 causes the rotor 2 to overcome the repulsive force of the magnet 6 for positioning of the initial position of the rotor 2.

Since the delay time of the delay circuit 15 is set to be constant, the vibration of the rotor 2 is increased in amplitude with the gradual increase of the acceleration and eventually can overcome the repulsive force of the magnet 6 for positioning of the initial position. When the rotor 2 continues to normally rotate, the delay time based on the BH-L and BL-H takes place in the same rotational direction as the rotor 2, whereby this does not substantially affect the energization period of the coil 5 and therefore the motor can be designed according to the conventional design specifications.

When the permanent magnet 3 or 4 of the rotor 2 is stopped immediately above the initial-position positioning magnet 6 though this is very rare, the turning on of the power source causes the transistor Q161 to be turned on for a constant time (about 10 ms) determined by a resistor R161 and a capacitor C161 making up the timer circuit 16, whereby the switching element 11 is turned on so that the coil 5 is put in its energized state so as to attract the permanent magnet 3 or 4 of the rotor 2, thus resulting in that the permanent magnet 3 or 4 of the rotor 2 is moved from its immediate above position of the initial-position positioning magnet 6, thereby avoiding the disabled rotation of the motor. In FIG. 6, reference symbol D161 denotes a diode, C a capacitor, R a resistor, R a resistor, D1 and D2 diodes respectively.

Explanation will next be made as to another embodiment of the present invention by referring to FIGS. 7 to 9. The present embodiment corresponds to an improvement in the foregoing first embodiment wherein mainly the timer circuit section is improved and a start control function is added of controlling the switching element 11 independently of the control of the switching element 11 by means of the magnetic sensor 7. This start control function may be arranged as combined with the delay circuit section of the foregoing embodiment.

Figure 9:
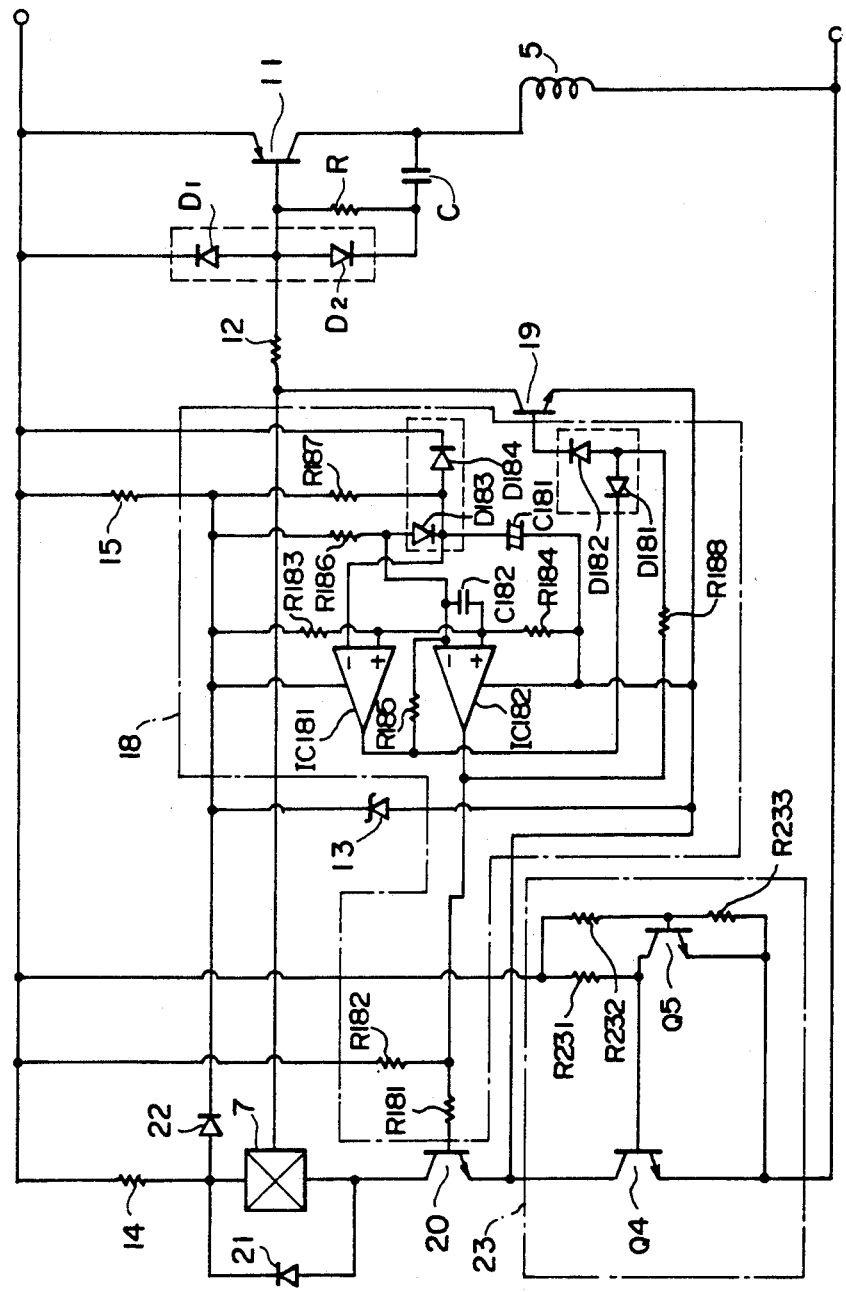
FIG. 9 is a specific circuit diagram of the motor.

FIG. 7 is a circuit diagram of a brushless motor in accordance with another embodiment of the present invention, FIG. 8 is a diagram for explaining the operation of the motor, and FIG. 9 is a specific circuit diagram of the motor. In the drawings, the same parts as those in FIGS. 1 to 6 are denoted by the same reference numerals and symbols. In the drawings, a start control circuit 18 functions to turn on and off a switching element 19 for controlling the switching element 11 and also to turn on and off a switching element 20 for controlling the operation of the magnetic sensor 7. More specifically, the start control circuit 18, as shown in FIG. 9, comprises comparators IC181 and IC182, diodes D181, D182, D183 and D184, resistors R181 to R188 and capacitors C181 and C182. In FIG. 9, when a power source is turned on, a charging current flows through the capacitor C181, the resistor R186, the diode D183 and the resistor R187 to thereby increase gradually a voltage across the capacitor C181. Applied to respective plus terminals of the comparators IC181 and IC182 is a reference voltage which is determined by the voltage division ratio of the resistors R183 and R184. Voltages at respective minus terminals of the comparators IC181 and IC182 are increased with the voltage across the capacitor C181. When the voltage at the minus terminal of the comparator IC182 first exceeds the above reference voltage, an output at the output terminal of the comparator IC182 is changed from its high level to low. At this time, the switching elements 19 and 20 are switched from the on state to off. When the switching element 19 is put in its on state, the switching element 11 is forcibly turned on regardless of the magnetic sensor 7 because a driving current flows therethrough via the current limiting element 12. When the switching elements 19 and 20 are in the off state, the switching element 11 is forcibly turned off regardless of the magnetic sensor 7. Accordingly, the switching element 11 is put in the forced on state until the power source is turned on and the voltage at the minus terminal of the comparator IC182 exceeds the aforementioned reference voltage. As soon as the voltage at the minus terminal of the comparator IC182 exceeds the aforementioned reference voltage, the switching element 11 is forcingly turned off. When the capacitor C181 is further charged to such an extent that the voltage at the minus terminal of the comparator IC181 exceeds the above reference voltage, the output of the comparator IC181 at its output terminal is changed from its high level to low. At this time, the comparator IC182 receives at tis minus terminal a voltage which is determined by the voltage division ratio of the resistors R185 and R186 and which is previously set to be smaller than the above reference voltage. As a result, the output of the comparator IC182 at the output terminal is changed from its high level to low. At this time, the switching element 20 is switched to the on state and the switching element 19 remains off because of its low level via the diode D183. Accordingly, the switching element 11 is released from its forced on/off state and is operated according to the on/off operation of the magnetic sensor 7. In FIG. 7, a constant-voltage diode 13, which is applied with the voltage of the power source via a resistor 15, is provided for the stabilization of operation of the start control circuit 18. Diodes 21 and 22 are provided for prevention of any surging current of the magnetic sensor 7, while a surge prevention circuit 23 is provided to protect circuits and elements other than the switching element 11. A current limiting resistor 14 is connected in a power source line for driving the magnetic sensor 7. More specifically, the surge prevention circuit 23 comprises transistors Q231 and Q232, and resistors R231, R232 and R233.

With such an arrangement, when the permanent magnet 4 is located above the magnetic sensor 7 as shown in FIG. 8, the output of the magnetic sensor 7 is in its on state, so that a current flows through the coil 5 to develop a torque for attracting the permanent magnet 3, whereby the rotor 2 is rotated. As the permanent magnet 3 is moved close toward the coil 5, the permanent magnet 4 is moved away from the magnetic sensor 7, so that the output of the magnetic sensor 7 is put in its off state and the switching element 11 is put in its off state. As a result, the current flowing through the coil 5 is stopped and the attractive force between the permanent magnet 4 and the coil 5 disappears, whereby the rotor is coasting.

Thereafter, the permanent magnets 3 and 4 are put in the mutually opposite positions to the above and continuously perform similar movement to the above.

A force resisting the movement of the rotor 2 trying to coast continuously exists as a repulsive force between the magnet 6 for positioning of the initial position of the rotor 2 and the permanent magnets 3 and 4 of the rotor 2. Therefore, there is a danger that the permanent magnet 3 or 4 of the rotor 2 is stopped immediately above the initial-position positioning magnet 6 of the rotor 2. The present embodiment, however, is arranged so that the turning on of the power source causes the switching element 11 to be forcibly turned on for a constant time (about 10 seconds). For this reason, even when the permanent magnet 3 or 4 of the rotor 2 is stopped immediately above the initial-position positioning magnet 6 of the rotor 2 or when the rotor 2 is reversely rotating under the influence of the repulsive force of the initial-position positioning magnet of the rotor 2, the permanent magnet 3 or 4 of the rotor 2 is attracted toward the coil 5 and stopped immediately above the coil 5. Thereafter, since the switching element 11 is forcibly turned off, the rotor 2 is reversely rotated under the influence of the repulsive force of the initial-position positioning magnet 6 of the rotor 2 so that the permanent magnet 3 or 4 of the rotor 2 is stopped immediately above the magnetic sensor 7. When the rotor 2 is stopped at its initial position and is to be rotated under control of the magnetic sensor 7 through the switching element 11, the magnetic sensor 7 is in the detection on mode at the initial position of the rotor 2 so that, while the rotor 2 is rotated and the magnetic sensor 7 is changed from its detection on to detection off, the rotor 2 can acquire a sufficient rotary torque, with the result that the rotor 2 can overcome the repulsive force of the initial-position positioning magnet 6 of the rotor 2 and can continuously rotate.

As has been disclosed in the foregoing, in accordance with the present invention, the current on period of the coil during which a current flows therethrough can be prolonged by an amount corresponding to a sum of the delay time of the delay circuit and the hysteresis width BW determined by the performance of the magnetic sensor, only when the rotor is vibrating and it is necessary for the rotor to overcome the repulsive force of the initial-position positioning magnet of the rotor. As a result, there can be provided a brushless motor wherein the rotor can be rotated without yielding the repulsive force of the initial-position positioning magnet of the rotor and which also can be immune to the influence of variations in the BW of the magnetic sensor.

When the start control circuit is employed, since the rotation of the rotor can be started from its initial position after application of the power source voltage, the rotor can be rotated without yielding the repulsive force of the initial-position positioning magnet of the rotor and without being subjected to the influence of variations in the BW of the magnetic sensor.

What is claimed is:

1. A brushless motor comprising:
   a rotor having permanent magnets;
   a single coil for rotating said rotor;
   a magnet for holding said rotor at an initial position when said coil is de-energized;
   a switching element inserted between said coil and a power source;
   a magnetic sensor for detecting a position of one of the permanent magnets of said rotor to control switching operation of said switching element;
   a current limiting element inserted between said magnetic sensor and said switching element; and
   a delay circuit inserted between said current limiting element and said magnetic sensor or between said current limiting element and said switching element for extending a hysteresis width of said sensor and an on-period of said switching element whereby a conduction period to said coil is increased when said rotor is vibrated as a result of a repulsion force of said magnet.

2. A brushless motor as set forth in claim 1, further comprising a timer circuit for conducting said switching element for a predetermined time at the time of turning on said power source.

3. A brushless motor as set forth in claim 1, further comprising a start control circuit for conducting said switching element for a predetermined time independently of control of said magnetic sensor at the time of turning on the power source in order to temporarily stop said rotor on said coil, for making the switching element non-conductive for a predetermined time thereafter in order to stop said rotor at a magnetically balanced point and further thereafter for being made independent of the control of the switching element,
   said magnetic sensor being positioned to correspond to the magnetically balanced point of said rotor.

4. A brushless motor comprising:
   a rotor having permanent magnets;
   a single coil for rotating said rotor;
   a magnet for holding said rotor at an initial position when said coil is de-energized;
   a switching element inserted between said coil and a power source;
   a magnetic sensor for detecting a position of one of the permanent magnets of said rotor to control switching operation of said switching element; and
   a start control circuit for conducting said switching element for a predetermined time independently of control of said magnetic sensor at the time of turning on the power source in order to temporarily stop said rotor on said coil, for making the switching element non-conductive for a predetermined time there-after in order to stop said rotor at a magnetically balanced point and further thereafter for being made independent of the control of the switching element.

5. A brushless motor as set forth in claim 4, wherein said magnetic sensor is positioned to correspond to said magnetically balanced point of said rotor.

* * * * *